Sept. 25, 1945.  L. MEISTER  2,385,367
APPARATUS FOR INSPECTING FLASH HOLES IN PRIMER TUBES
Filed July 20, 1942
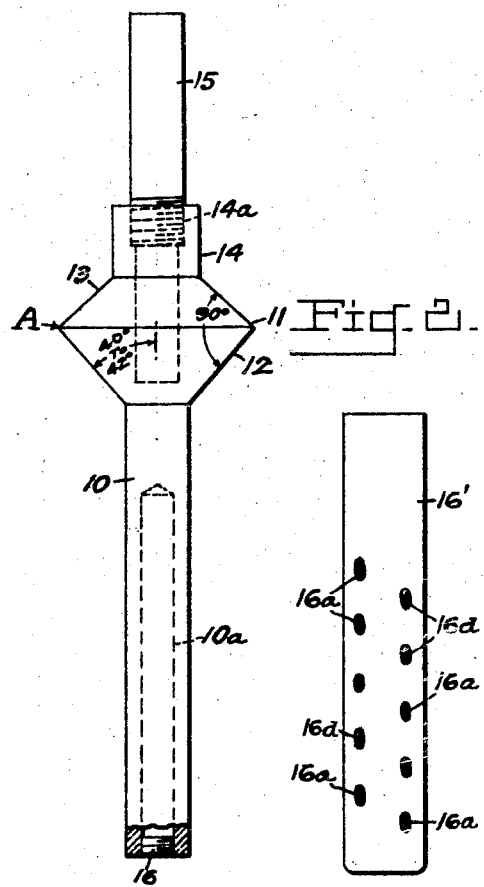
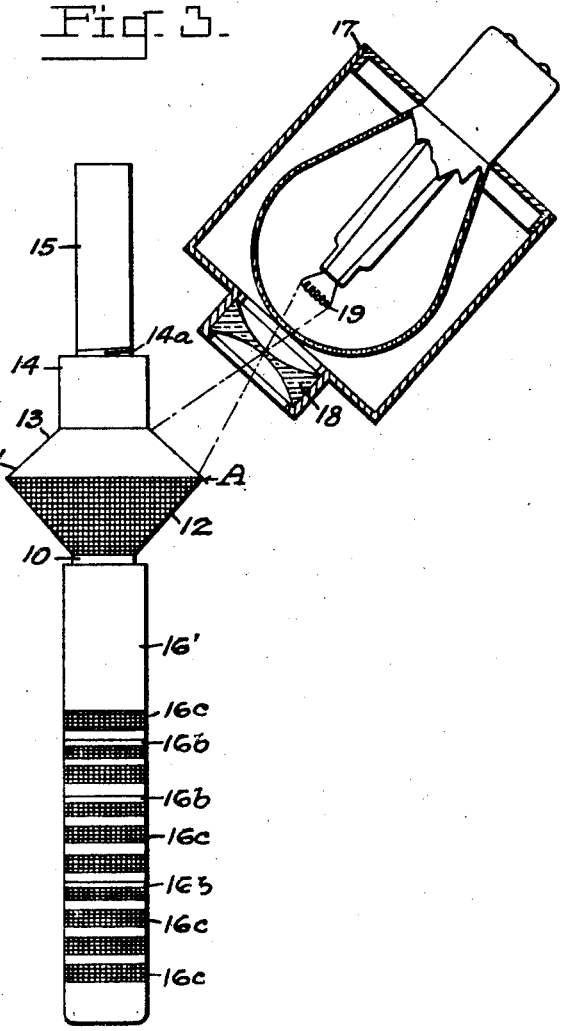
Inventor
Leo Meister Patented Sept. 25, 1945

2,385,367

UNITED STATES PATENT OFFICE 2,385,367

APPARATUS FOR INSPECTING FLASH HOLES IN PRIMER TUBES

Leo Meister, Irvington, N. J.

Application July 20, 1942, Serial No. 451,679

3 Claims. (Cl. 88—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the inspection of holes in objects, and is herein disclosed in apparatus for the inspection of waterproofed flash holes in artillery primer tubes.

An object of this invention is to provide apparatus for inspection of holes in objects.

Another object of this invention is to provide apparatus whereby inspection and repair operations may be performed simultaneously at the time excess waterproof coating is wiped from the exterior of primer tubes in the course of their manufacture.

Another object of this invention is to provide apparatus whereby inspection of primer tubes after waterproofing and drying is no longer required; inspection is necessary in accordance with prior art practise.

The specific nature of the invention as well as other objects and advantages thereof will clearly appear from a description of a preferred embodiment as shown in the accompanying drawing in which:

Figure 1 shows my article for inspecting tubes.

Figure 2 shows the primer tube which is to be inspected by using the article of Figure 1.

Figure 3 shows the article of Figure 2 assembled on the article of Figure 1 with a light source in testing position.

In Figure 1 is shown an elevational view of my rotatable body having a cylindrical and partially tubular body portion 10, a light receiving and diverting head 11 comprising cone 12 and cone 13, a cylindrical projection 14 adapted to receive a spindle 15 which is engaged by an element of a turning mechanism, for instance, the chuck of a drill press or the like (not shown), and a polished metal plug 16 which serves as a light reflector and dirt stop.

The body A is essentially of the plastic material, methyl methacrylate, commonly referred to as "Lucite" and "Plexiglass;" and, the mutually inverted conical portions 12, 13 in forming head 11, have critical dimensions. The truncated conical portion 12 has its outer boundary line projecting at an angle in the range of 40 to 42 degrees from the axis of cylinder 10 and the inverted conical portion 13 joins the conical portion 13 at an angle of ninety degrees as indicated in Figure 1.

It is understood that other plastic materials similar to "Lucite" or "Plexiglass" may be used so long as the index of refraction of the same is comparable, and in applicant's particular arrangement it is desirable that the material have a low heat conductivity.

Spindle 15 is fastened in cylindrical projection 14 by means similar to screw threads 14a, and it is noted that spindle 15 extends into the body of the thermoplastic through conical portion 13 and into truncated conical portion 12.

The outer surface of conical portion 13 is polished and the outer surface of conical portion 12 is preferably coated with an opaque material such as black paint.

The cylindrical body portion 10 having hollow portion 10a closed by polished metal plug 16 has its outer surface finished to appear as the finish of ground glass.

In the manufacture of primer tubes 16' in the production of ammunition it is important that the tube flash holes 16a be filled with a compound, for example tar, whereby the interior of the tube is sealed against humidity, etc., but said compound is cleared away by detonation of powder within tube 16'. This invention in its narrowest sense relates to the inspection of the effectiveness of the compound sealing operation. The compound sealing operation consists in lining the primer tube 16' with paper (not shown) and then coating the flash holes 16a with a compound similar to tar; imperfect coating after this operation results in holes allowing transmission of light as shown in Figure 2.

After the sealing operation the primer tube is placed on the body portion 10 which is adapted to snugly receive the primer tube 16' and then the body portion 10 is turned by rotary motion imparted to spindle 15. Light is projected on and perpendicular to the polished outer surface of cone 13 from a suitable light source and as the light passes through the imperfectly coated flash holes 16d in the primer holes, due to the persistency of vision of the observer, light streaks 16b will appear; the observer may then apply an additional corrective coating of compound to those spots which cause light streaks 16b. As the tube 16' is rotated the tar in the flash holes will cause the appearance of black streaks 16c due to the persistency of vision.

A suitable light source consists of an opaque box 17 having mounted thereon lens 18 and enclosing a lamp with a concentrated light emitting filament 19 and positioned so as to project light perpendicular to the outer rotating face of cone 13.

Due to the particular shape of body A light is led downwardly without substantial loss to the tubular portion of body 10 from where it is projected out of defective flash holes 16d.

I claim:

1. An article of manufacture comprising a transparent cylindrical body having a truncated conical portion of transparent material coaxially joined thereto, a second conical portion, also of transparent material, coaxially mounted on the base of the first conical portion in inverted relationship thereto, with the outer boundary line thereof meeting the outer boundary line of the joined conical portion, the cylindrical body having a ground surface and being tubular at the end opposite the joined end, and a metal plug closing the tubular end and having a polished surface facing the interior of the body.

2. An article of manufacture comprising a transparent cylindrical body having a truncated transparent conical portion coaxially joined thereto, the outer boundary line of said conical portion making a projected angle of forty-two degrees with said axis, a second conical portion, also of transparent material, coaxially mounted on the base of the first conical portion in inverted relationship thereto, with the outer boundary line thereof meeting the outer boundary line of the joined conical portion at a ninety degree angle, said first-mentioned conical portion being coated with opaque material, and said cylindrical body having a ground surface.

3. An article of manufacture comprising a transparent cylindrical block of methyl methacrylate having a frusto-conical portion coaxially joined thereto, the outer boundary line of said conical portion making a projected angle of forty-two degrees with said axis, a second frusto-conical portion coaxially mounted on the base of the first conical portion in inverted relationship thereto, with the outer boundary line thereof meeting the outer boundary line of the joined conical portion at a ninety degree angle, said first-mentioned conical portion being coated with opaque material, said cylindrical body having a ground outer surface and being tubular with the inner walls polished, and a polished metal plug inserted in the tubular portion of the cylindrical body.

LEO MEISTER.